United States Patent
Sato et al.

(10) Patent No.: US 6,990,682 B1
(45) Date of Patent: Jan. 24, 2006

(54) TWO-WAY CATV SYSTEM

(75) Inventors: Hiroaki Sato, Kawasaki (JP); Yozo Sudo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/528,823

(22) Filed: Mar. 20, 2000

(30) Foreign Application Priority Data

Jun. 29, 1999 (JP) ................... 11-183401

(51) Int. Cl.
*H04N 7/173* (2006.01)

(52) U.S. Cl. .................. 725/127; 725/149; 725/150

(58) Field of Classification Search ........ 725/124–127, 725/149, 135, 130, 150; 381/94.6; 330/130, 330/132, 149; 455/70, 71; 327/355, 563, 327/51, 52

See application file for complete search history.

(56) References Cited

U.S. PATENT DOCUMENTS

| | | | | |
|---|---|---|---|---|
| 3,704,419 A | * | 11/1972 | Rheinfelder | 725/149 |
| 3,781,703 A | * | 12/1973 | Duty | 330/52 |
| 3,835,393 A | * | 9/1974 | Marron | 725/124 |
| 3,944,742 A | * | 3/1976 | Cunningham | 725/144 |
| 4,040,045 A | * | 8/1977 | Osborne et al. | 340/537 |
| 4,268,858 A | * | 5/1981 | Wood | 725/74 |
| 4,347,403 A | * | 8/1982 | Schwager et al. | 327/107 |
| 4,920,533 A | * | 4/1990 | Dufresne et al. | 370/445 |
| 4,924,191 A | * | 5/1990 | Erb et al. | 330/130 |
| 5,109,286 A | * | 4/1992 | West et al. | 725/127 |
| 5,255,086 A | * | 10/1993 | McMullan et al. | 725/131 |
| 5,343,236 A | * | 8/1994 | Koppe et al. | 725/149 |
| 5,505,901 A | * | 4/1996 | Harney et al. | 725/4 |
| 5,581,801 A | * | 12/1996 | Spriester et al. | 725/149 |
| 5,867,763 A | * | 2/1999 | Dean et al. | 725/114 |
| 5,898,899 A | * | 4/1999 | Ellis | 725/127 |
| 5,956,075 A | * | 9/1999 | Matsuo | 725/131 |
| 5,977,831 A | * | 11/1999 | Davis et al. | 330/279 |
| 6,054,905 A | * | 4/2000 | Gresko | 333/100 |
| 6,067,441 A | * | 5/2000 | Pan | 725/150 |
| 6,088,569 A | * | 7/2000 | Bach et al. | 725/149 |
| 6,530,088 B1 | * | 3/2003 | Brickell et al. | 725/127 |

FOREIGN PATENT DOCUMENTS

| | | |
|---|---|---|
| JP | 4-86084 | 3/1992 |
| JP | 4-296186 | 10/1992 |

* cited by examiner

*Primary Examiner*—Vivek Srivastava
(74) *Attorney, Agent, or Firm*—Katten Muchin Rosenman LLP

(57) ABSTRACT

A two-way CATV system is easy of maintenance, stable of a transmission quality and capable of restraining intermodulation distortion noises of downstream RF signal carriers which are caused by non-linearity of electric contact members of coaxial connectors among upstream ingress noises becoming a problem when performing communications services by utilizing a CATV transmission path. The two-way CATV system comprises at least one bidirectional amplifier provided on a CATV transmission path for connecting a CATV center station to a subscriber home, a bias voltage superposing element for superposing, with a bias voltage, a downstream signal transmitted along a coaxial transmission path subordinate to an amplifier at the terminal among the bidirectional amplifiers, and a bias current adjusting load element, provided at the end of the coaxial transmission path, for setting the bias current corresponding to an application of the bias voltage superposed by the bias voltage superposing element.

4 Claims, 16 Drawing Sheets

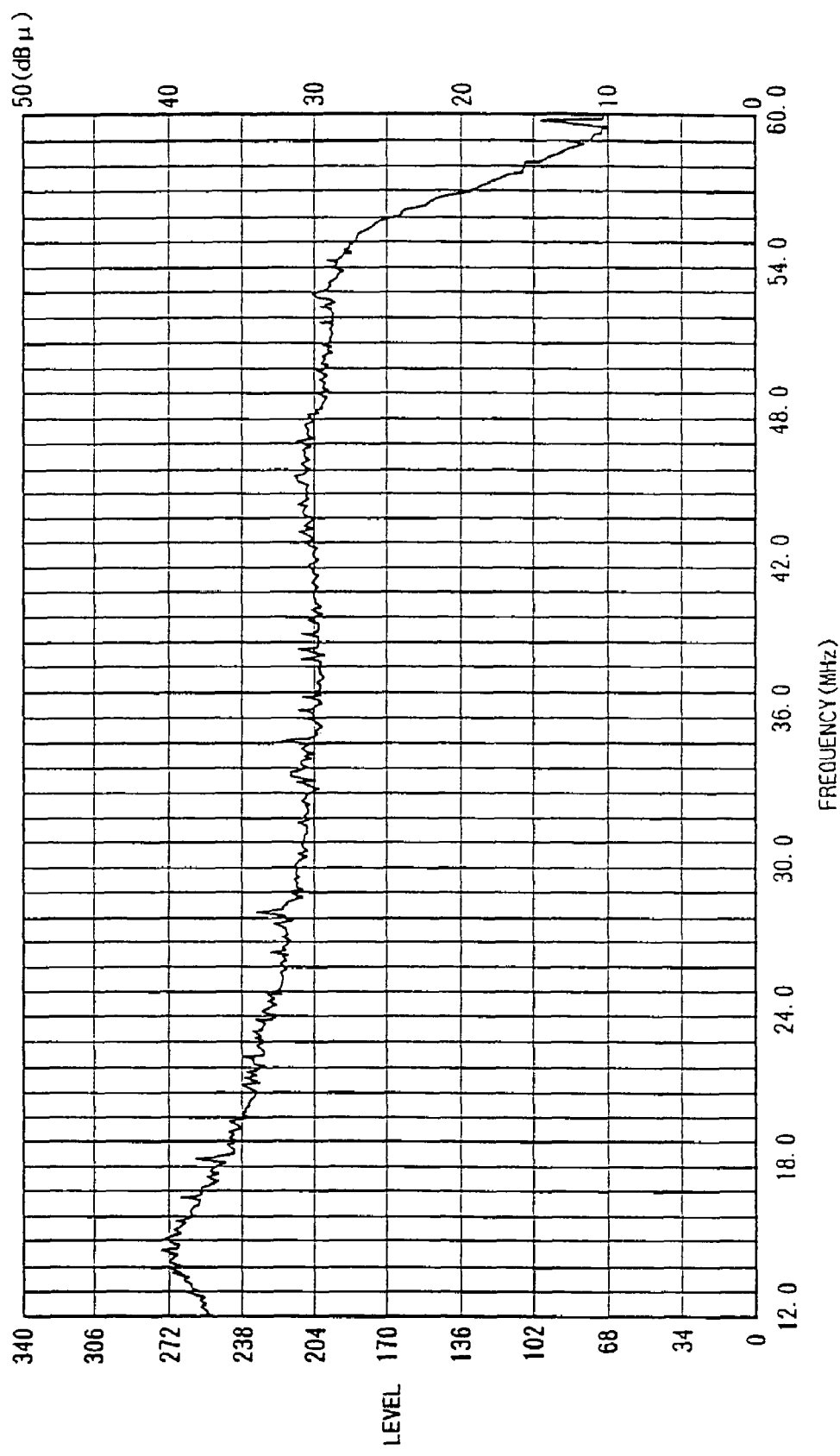

TWO-WAY CATV SYSTEM

BACKGROUND OF THE INVENTION

The present invention relates generally to a two-way CATV system and, more particularly, to a two-way CATV system capable of restraining upstream ingress noises which might become a problem in the case of performing communication services by utilizing a CATV oriented transmission path (CATV line), and of facilitating the maintenance.

A CATV (Community Antenna Television) system is constructed for the purpose of retransmitting broadcast programs in TV broadcasting, satellite broadcasting, local origination broadcasting, etc., wherein information signals are transmitted only in a downstream direction to individual subscriber homes, etc. from a CATV center station (head end).

Over the recent years, a two-way CATV system has been introduced, wherein not only a broadcasting device but also a two-way communication device are installed within a CATV center station of the CATV system, the CATV transmission being structured as an optical coaxial hybrid transmission path composed of both an optical fiber cable and a coaxial cable, and amplifiers for relay amplifications being disposed in order to compensate for a loss of the transmission path in broadband. The two-way CATV system is capable of transmitting upstream signals by utilizing a frequency band unused for transmitting downstream signals for a broadcast program, and services to promote a fusion of broadcasting services and communications services.

In the CATV system of which a main purpose is to provide the broadcasting services, a transmission quality of the downstream signals (a transmission band is, e.g., 70 MHz through 750 MHz) is managed. In the two-way CATV system introduced so far, however, with respect to upstream signals (a transmission band is, e.g., 10 MHz to 55 MHz), the usage thereof is limited to a data transmission of monitor signals of home terminals of subscriber homes, amplifiers on the CATV transmission path and power supply devices to the amplifiers, and to temporary utilization for relay transmission to a CATV center station from an event site, and hence a transmission quality thereof is not necessarily sufficiently managed at a high quality level with stability.

In the case of utilizing the CATV transmission path for communications, it is of much importance to manage the upstream signals (up-signals) together with the downstream signals (down-signals). In particular, an important factor for determining a quality of the two-way CATV system may be so-called ingress noises, in which the noises caused from within a multiplicity of amplifiers, tap-off lines and the subscriber homes, enter in the transmission band of the upstream signals.

The ingress noises are, it is generally considered, induced by the following causes, and counter measures against those noises are now in the process of being taken. The first cause is the thermal noises generated from the amplifiers and the terminals in the subscriber homes. A countermeasure against first cause is that the thermal noises are inevitably produced and therefore theoretically calculated, and the numbers of the amplifiers and of the terminals are limited so that no problems in terms of the system might arise. Further, the second cause may be jump-in noises from outside, viz., the external noises derived from amateur radio operations and citizen's band operations. A countermeasure against the second cause is that the system is designed and maintained to ensure over a predetermined level of immunity against the external noises between a trunk and branch lines of the transmission path and in-form wiring. Further, a fault of the device and fluctuations in adjustment thereof might cause otherwise the ingress noises, however, a steady noise occurs, and the maintenance is comparatively easy to perform.

Incidentally, the coaxial connector of the coaxial cable which is a passive part, has hitherto been conceived as a part of the linear CATV transmission path, however, it was confirmed from results of measurement by a certain CATV operator and in a common path distortion described in the technological report "Broadband Return Systems for Hybrid Fiber/Coax Cable TV Networks" by Donald Raskin, Dean Stoneback, published in December, 1997, Pranntice Hall PTR" that the electric contact surface of the coaxial connector, i.e., an easy-to-slacken portion by contacts of different kinds of base metals (Cu, Al, etc.) operates non-linearly due to a diode effect, and hence inter-modulation distortion noises of downstream RF carriers occur also in the transmission band of the upstream signals.

The upstream ingress noises attributed to the inter-modulation distortion by the non-linear characteristic of the electric contact surface of the coaxial connector, have the following distinctive aspects. First, a multiplicity of downstream signals are mixed with a complicity, and therefore the ingress noises are produced over the entire transmission bands of the upstream signals. However, a periodic spectrum at an interval of 6 MHz or 2 MHz is observed because of receiving an influence of a carrier array spectrum of a downstream signal channel. Second, as for a frequency of the occurrence thereof, there is a small possibility in which the noises might occur steadily, and there might be some cases where the occurrence of noises continues occasionally for several seconds to several minutes and continues for several hours.

Third, the very place where the noises occur is the coaxial connector through which the high-level downstream signals just under the output of an extension amplifier, and the noises, an occurred state thereof being unstable, might disappear during rework. If incompletely reworked, however, there is a possibility in which the noises again occur. Fourth, the upstream ingress noises due to the inter-modulation distortion exhibits a periodic spectrum of which a peak has a magnitude larger by 10 dB trough 20 dB than the thermal noises produced mainly from the amplifier.

SUMMARY OF THE INVENTION

Accordingly, it is a primary object of the present invention to provide a two-way CATV system which is easy to maintain, stable of a transmission quality and capable of restraining inter-modulation distortion noises of downstream RF signal carriers which are caused by non-linearity of electric contact members of coaxial connectors among upstream ingress noises becoming a problem when performing communications services by utilizing a CATV transmission path.

To accomplish the above object, in the two-way CATV system according to the present invention, near the end of the CATV extension line for transmitting only RF signals, more specifically, outer conductors and center conductor of electric contact members of coaxial connectors at the end of the extension line normally supplied with no electric power for operating amplifiers, are supplied (superposed) with a proper bias voltage and current which are by far larger than an RF signal voltage and current but are not excessive of a power loss thereof. With this contrivance, the electric contact surfaces easy to be inactivated in an outdoor environment are activated by applying a proper electric field therebetween, thereby restraining inter-modulation distortion noises due to non-linearity.

According to a first aspect of the present invention, a two-way CATV system comprises at least one bidirectional amplifier provided on a CATV transmission path for connecting a CATV center station to a subscriber home, a bias voltage superposing element for superposing, with a bias voltage, a downstream signal transmitted along a coaxial extension line subordinate to an amplifier at the terminal among the bidirectional amplifiers, and a bias current adjusting load element, provided at the end of the coaxial extension line, for setting the bias current corresponding to an application of the bias voltage superposed by the bias voltage superposing element.

According to a second aspect of the present invention, a two-way CATV system comprises at least one bidirectional amplifier provided on a CATV transmission path for connecting a CATV center station to a subscriber home, a bias voltage superposing element for superposing, with a bias voltage, a downstream signal transmitted along a coaxial extension line subordinate to an amplifier at the terminal among the bidirectional amplifiers, and a bias current adjusting load element, provided at each of tap-offs of the coaxial transmission path, for setting the bias current corresponding to an application of the bias voltage superposed by the bias voltage superposing element.

According to a third aspect of the present invention, in the two-way CATV system according to the first or second aspect of the invention, the bias current adjusting load element may be a resistance element.

According to a fourth aspect of the present invention, in the two-way CATV system according to the first or second aspect of the invention, the bias current adjusting load element may be constructed of an impedance element including at least one of an inductor and a capacitor.

According to a fifth aspect of the present invention, in the two-way CATV system according to the first or second aspect of the invention, the bias voltage with which the bias voltage superposing element superposes the downstream signal, may be an AC bias voltage.

According to a sixth aspect of the present invention, in the two-way CATV system according to the first or second aspect of the invention, the bias voltage superposing element may include an element for generating a DC bias voltage as the bias voltage with which the downstream signal is superposed.

According to a seventh aspect of the present invention, in the two-way CATV system according to the first or second aspect of the invention, the bias voltage superposing element may include an element for generating a pulsating bias voltage as the bias voltage with which the downstream signal is superposed.

According to an eighth aspect of the present invention, in the two-way CATV system according to the first or second aspect of the invention, the bias voltage superposing element may include an element for generating positive and negative DC bias voltages as the bias voltages with which the downstream signal is superposed, and an element for alternately periodically superposing the positive and negative DC bias voltages in response to control signals given from the CATV center station.

According to a ninth aspect of the present invention, in the two-way CATV system according to the first or second aspect of the invention, the bias voltage superposing element may include an element for generating positive and negative pulsating bias voltages as the bias voltages with which the downstream signal is superposed, and an element for alternately periodically superposing the positive and negative pulsating bias voltages in response to control signals given from the CATV center station.

According to a tenth aspect of the present invention, in the two-way CATV system according to the first or second aspect of the invention, the bias voltage superposing element may include an element for generating positive and negative DC bias voltages as the bias voltages with which the downstream signal is superposed, and an element for alternately superposing the positive and negative DC bias voltages in response to time-period signals.

According to an eleventh aspect of the present invention, in the two-way CATV system according to the first or second aspect of the invention, the bias voltage superposing element may include an element for generating positive and negative pulsating bias voltages as the bias voltages with which the downstream signal is superposed, and an element for alternately superposing the positive and negative pulsating bias voltages in response to time-period signals.

According to a twelfth aspect of the present invention, in the two-way CATV system according to the first or second aspect of the invention, the bias voltage with which the bias voltage superposing element superposes the downstream signal may be an AC bias voltage, and the two-way CATV system may further comprise an element for supplying the coaxial transmission path with the AC bias voltage in response to the control signal given from the CATV center station.

According to a thirteenth aspect of the present invention, in the two-way CATV system according to the first or second aspect of the invention, the bias voltage superposing element may include a transformer for boosting the AC bias voltage with which the downstream signal is superposed, a switch element for applying a large voltage in burst on a time-period basis for a short time, and a filter element for filtering only the burst bias current.

According to a fourteenth aspect of the present invention, in the two-way CATV system according to the first or second aspect of the invention, the bias voltage superposing element may include an element for boosting and rectifying the AC bias voltage with which the downstream signal is superposed, an electrostatic capacitance element for accumulating DC high voltage outputs, a switch element for discharging the DC high voltage in pulse on a time-period basis for a short time, and a filter element for filtering only the pulse bias current.

According to the present invention, it is feasible to intentionally eliminate the non-linear circuit noises due to instability of contact of the passive elements of the coaxial connectors on the CATV transmission path by a breakdown effect, and hence the two-way CATV system exhibiting a high quality and maintainability can be provided.

BRIEF DESCRIPTION OF THE DRAWINGS

These objects and advantages of this invention will become more apparent and more readily appreciated from the following detailed description of the presently preferred exemplary embodiments, taken in conjunction with the accompanying drawings of which:

FIG. 16 is a diagram showing the explanatory data for the ingress noises obviating effect.

DETAILED DESCRIPTION OF THE PREFERRED EMBODIMENTS

Embodiments of the present invention will hereinafter be described with reference to the accompanying drawings.

[Whole Structure of Two-Way CATV System]

Figure 1:
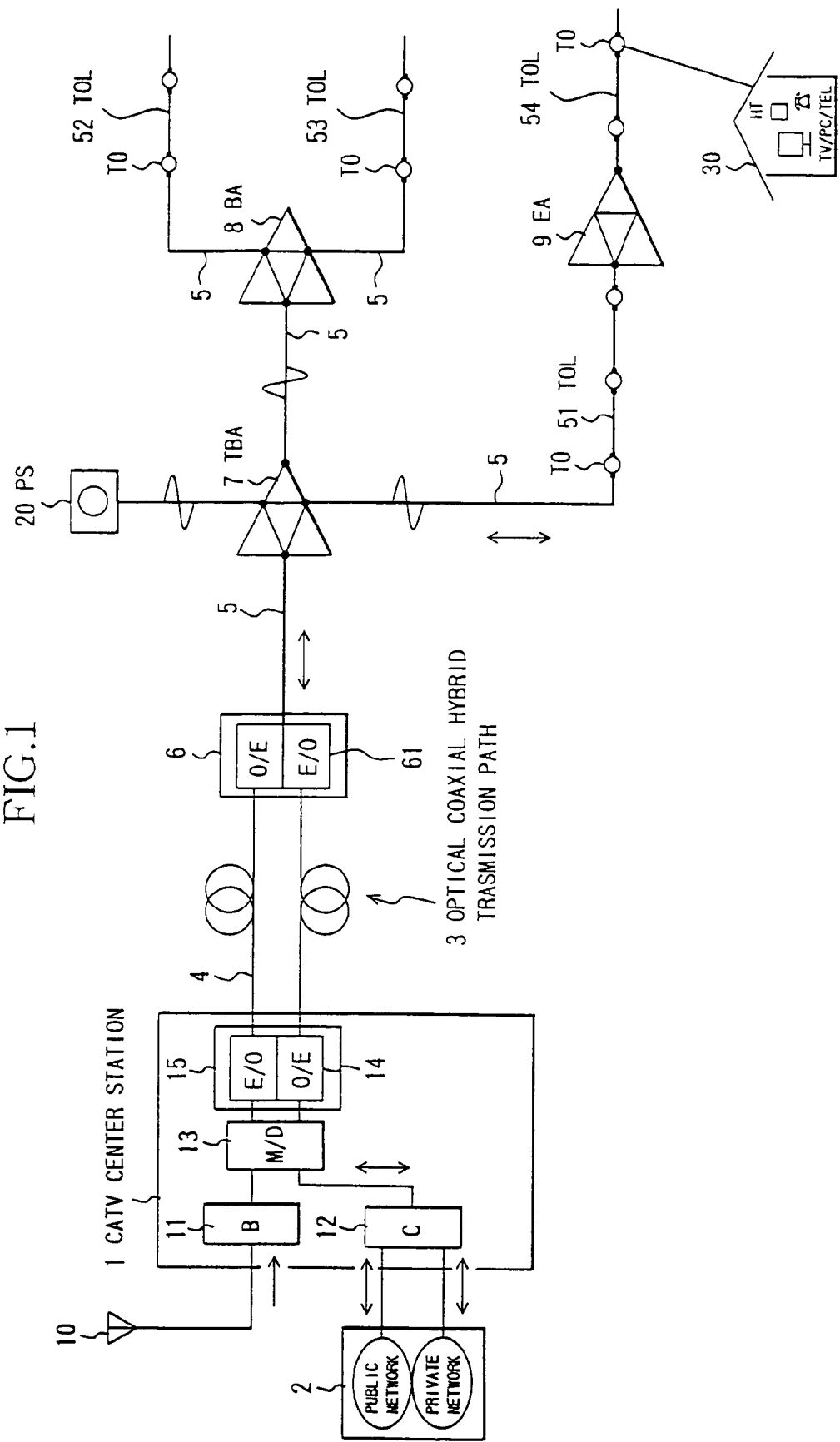
FIG. 1 is a block diagram showing a structure of a two-way CATV system in one embodiment of the present invention.

FIG. 1 shows a structure of a two-way CATV system in one embodiment of the present invention. Referring to FIG. 1, a CATV center station (head end) 1 is constructed of a broadcasting device (B)11 for frequency conversion, processing, and retransmitting RF signals derived from TV broadcasting received via an antenna 10, and local origination broadcasting, etc., a two-way communications device (C)12 including a router and a switch for transmitting and receiving communications information (speech and data) to and from other networks 2 such as a public network, an appropriate network and the Internet, a multiplexer/demultiplexer (M/D) 13, and a optical transmitter/receiver (T/R) 15 including an electro-optic/opto-electric (E/O, O/E) converter 14.

The multiplexer 13 transmits, to the optical transmitter, the RF signals inputted from the broadcasting device 11 and the communications information inputted from the bidirectional communications device 12 as downstream signals made corresponding to previously allocated frequency channels. The transmitter 15, including the E/O converter 14 has converted the downstream electric signals from the multiplexer 13 into optical signals, transmits these optical signals to the CATV, transmission path 3.

Further, the transmitter 15, including the O/E converter 14 has converted the optical signals into the electric signals, inputs these electric signals to the demultiplexer 13. The demultiplexer 13 takes the communications information of the inputted upstream signals out of the frequency channel, and transmits these pieces of information to the two-way communications device 12.

The CATV transmission path 3 is composed of an optical coaxial hybrid transmission path in which an optical fiber cable 4 and a coaxial cable 5 are disposed in a tree structure. The bidirectional optical transmitter/receiver 6 is disposed at a node between the optical fiber cable 4 and the coaxial cable 5. The two-way optical transmitter/receiver 6 has an E/O, O/E converter 61.

Disposed on the CATV transmission path 3 are a variety of bidirectional amplifiers (bidirectional repeaters) including a trunk branch amplifier (TBA) 7, a branch amplifier (BA) 8 and an extension amplifier (EA) 9, and a power supply device (PS) 20, whereby downstream and upstream signals are amplified and relayed. Transmission paths composed of coaxial cables 5 extending in terminal directions from the trunk branch amplifier (TBA) 7, the branch amplifier (BA) 8 and the line extender amplifier (EA) 9, are called tap-off lines (TOL) 51, 52, 53, 54, wherein a tap-off TO is provided at drop points to the subscriber homes of each line. Referring again to FIG. 1, connecting points between the amplifiers TBA, BA, EA, the tap-offs TO and the coaxial cables 5, are marked with black points [•] which indicate coaxial connectors.

A subscriber home 30, etc. is connected to each tap-off TO via a drop cable. The subscriber home 30 accommodates a broadcast receiving terminal such as a television set TV, a data communications terminal such as a personal computer PC and a voice communications terminal such as a telephone set TEL via a home terminal HT and a set top box (unillustrated) as well.

[Operation of Obviating Ingress Noises in Two-Way CATV System]

An activating operation of an electric contact by a superposition of a bias voltage and a bias current to the coaxial connector in the two-way CATV system shown in FIG. 1, will be explained with reference to FIG. 2.

Figure 2:
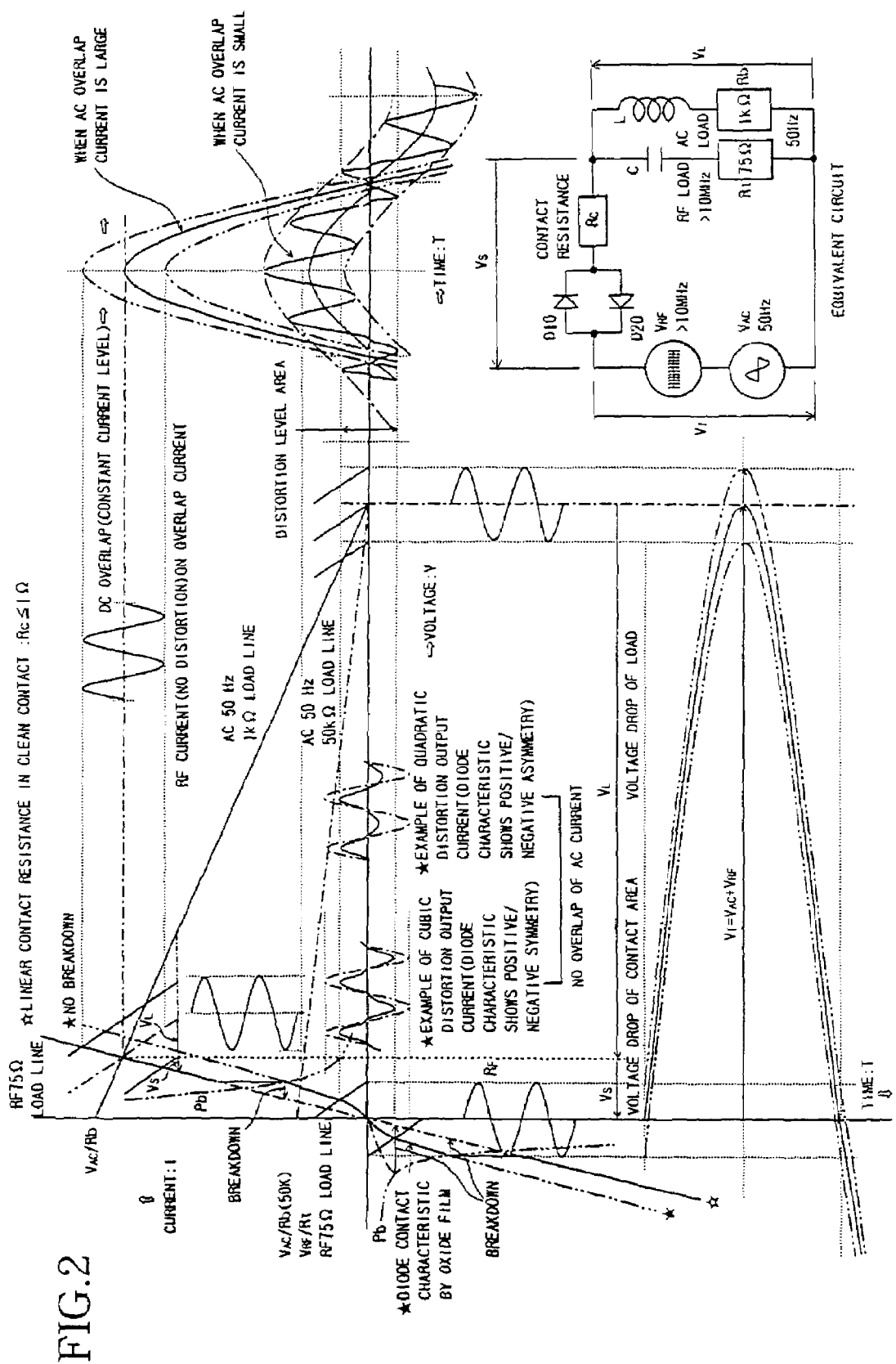
FIG. 2 is an explanatory characteristic diagram inclusive of an equivalent circuit diagram, showing a function of obviating ingress noises in the system illustrated in FIG. 1.

An equivalent circuit is illustrated in a right lower part in FIG. 2. A contact between an oxide layer and a metal surface, as a result of the oxide layer having grown on the surface of a base metal (Cu, Al, etc.) through a connector, or an electric contact between different kinds of base metals exhibiting an electronic potential, is modeled by a pair of parallel diodes D10, D20 disposed in directions opposite to each other. Linear contact resistances Rc possessed by the clean metal contact points are expressed by the diode couplings and series resistance elements. On the actual coaxial cable transmission path, each of them is expressed by one single element by simplifying a plurality of connectors connected in series.

An RF signal source $V_{RF}$ and an AC power source $V_{AC}$ for bias superposition are provided in a left area of the equivalent circuit. Further, an RF signal terminating resistor Rt (normally, 75Ω) connected to a home terminal of the subscriber home and an unsubscribed terminal, is provided in a right area thereof. The terminating resistor Rt normally incorporates a series capacitance element C of approximately 1,000 pF in order to cut the direct current through the commercial alternating current. Moreover, a load resistor Rb (1 KΩ) connected in series to an inductance element L for cutting the RF signals and transmitting the alternating current, is provided as a load of the bias current in parallel to the RF terminating resistor Rt.

The left half in FIG. 2 shows a VI characteristic of the equivalent circuit. A rightward oblique line indicates a voltage current characteristic of the connector contact resistance, and a bold cubic curve from the origin indicates a current rising characteristic of the parallel diode coupling. When the voltage drops of the diode contact resistance increases to some extent, the oxide layer falls into a breakdown, and the diode effect disappears. Hence, thereafter it turns out to be a linear contact resistance characteristic when in a clean contact and therefore becomes a one-dotted chain line characteristic as shown in FIG. 2.

Below the voltage V-axis, an RF power source voltage and an AC power source voltage are given with the time axis extending in a negative direction of the current I-axis. When there is no AC bias power source, only the RF voltage (on the order of 0.1 V) given on the I-axis is applied to the contact resistance and the RF load resistance. At this time, the load current is restrained low by a high resistance in the vicinity of the origin of the diode characteristic in an area where an instantaneous value of the RF voltage is small, and the diode current rises in an area where the instantaneous value is large. Hence, the result becomes as in the example of the cubic distortion output current depicted as solid line in the vicinity of the origin on the V-axis, while a one-dotted chain line indicate when there is no diode effect.

In the two-way CATV system, RF voltages for several tens of channels are simultaneously applied to this contact resistance, and hence the diode characteristics of the contact resistance cause several hundreds of distortion noise due to inter-modulations thereof, with the result that they fall as ingress noises in the transmission band of the upstream signals.

What is largely depicted on the I-axis is a part of waveform when the RF voltage (which is 0.1 V and over 10 MHz) is superposed over an AC bias voltage (70 V, 50 Hz). An instantaneous value (a peak value in FIG. 2) of the AC bias voltage is given on the V-axis, and a bias current value obtained by dividing the instantaneous value by an AC load resistance (1 K$\Omega$) is given on the I-axis, wherein a straight line connecting these two points is categorized as an AC load line. Voltage drops of the load and of the contact resistance are read from a cross point between the AC load line and a VI characteristic of the contact resistance, however, what is important is the voltage drop of the contact resistance due to the bias current. When the load resistance is large and the AC superposed current is small, as shown on the V-axis in the upper part of the equivalent circuit, an RF current distortion remains in an area where the bias current value is small.

Such being the case, the voltage drop of the contact resistance is set over a breakdown voltage of the diode formed in the contact area of the coaxial connector. This involves increasing to some extent the bias current determined by the AC load resistance as shown in the voltage V-axis in the upper part of the equivalent circuit. As a result of properly setting this current value, the diode effect disappears by the breakdown. Note that the load current with respect to the RF power source voltage flows to the 75$\Omega$ load line as in the case of no bias current along a steep oblique line of $-1/75$ drawn independently of the AC load line.

Further, when the DC bias current flows, as illustrated in an upper part of the VI characteristic, even if the above-mentioned breakdown of the contact resistance should not occur (in the case of an operation in a two-dotted line extending area of the VI characteristic), the RF signal is biased at a linear operating point apart from a non-linear area of the diode characteristic, and therefore an occurrence of the distortion noises decreases. As in the illustrated example, if the breakdown occurs, the linear contact is restored, and the occurrence of the distortion noises is improved.

[First Constructive Example of Obviating Ingress Noises]

Figure 3:
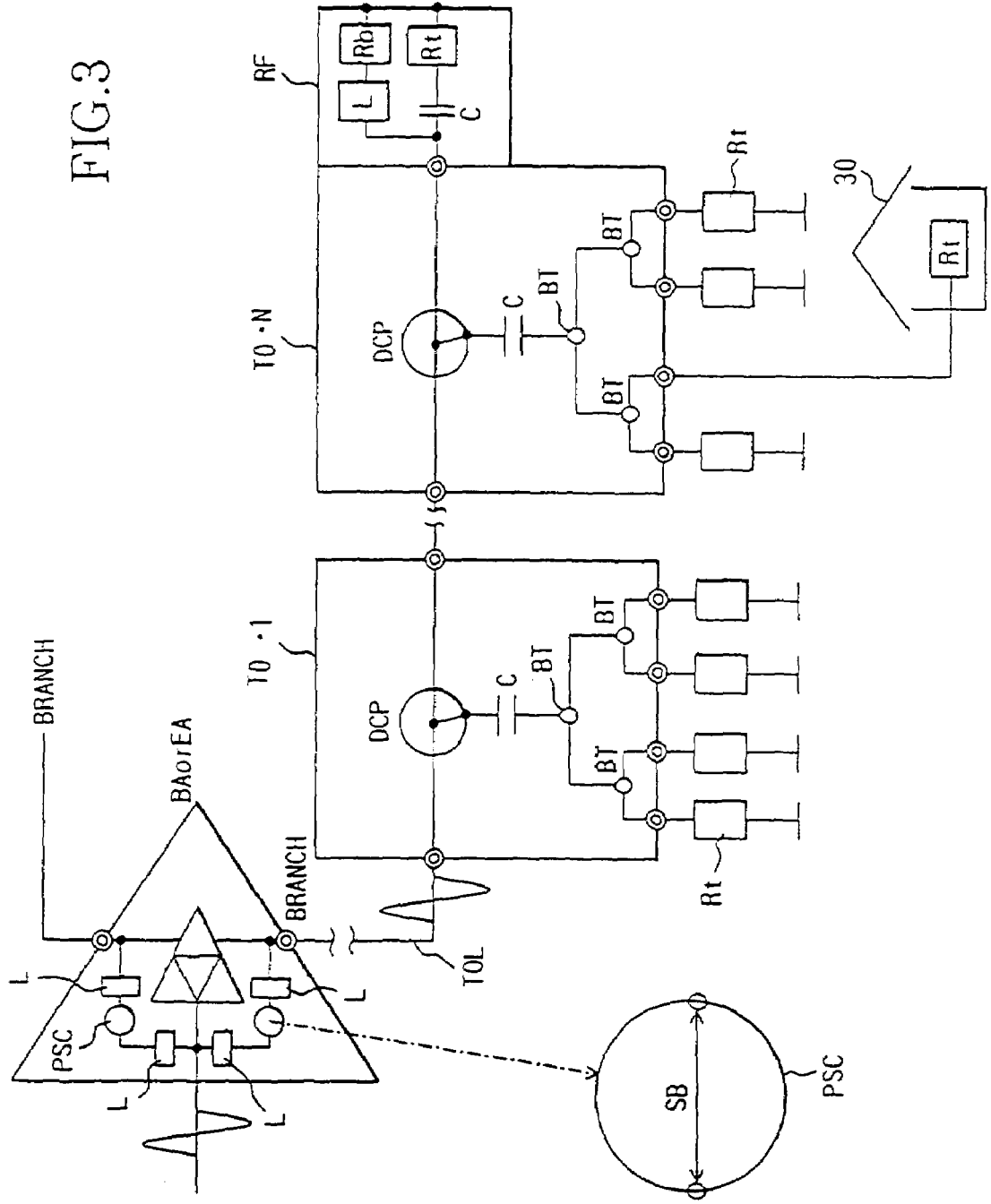
FIG. 3 is a block diagram showing a first constructive example of obviating the ingress noises.

FIG. 3 shows a first constructive example of obviating the ingress noises in the two-way CATV system illustrated in FIG. 1. Referring to FIG. 3, a commercial alternate alternating current (AC) voltage (normally, 40 V through 60 V) for supply to the amplifier is supplied from an output terminal of the amplifier at the terminal of the CATV transmission path 3, more specifically, the branch amplifier (BA) 8 or the line extender amplifier (EA) 9, and terminated by the RF terminating resistor (e.g., 75$\Omega$) having the resistor Rb for adjusting the bias current on the side of an output terminal of a branch tap-off TO.N at the end of the tap-off line TOL for diverging the downstream signals down to the individual subscriber homes 30. A power supply switching board PSC constituting a bias voltage superposing unit involves the use of a short bar SB.

Note that the reference symmetrical DCP designates a directional coupler, BT denotes a branch transformer, C represents a capacitor for cutting the direct current through the commercial alternating current, and Rt denotes a terminating resistor normally having 75$\Omega$ in the configuration extending from a branch tap-off TO.1 to the branch tap-off TO.N.

In this RF terminating the inductor L is inserted in order that the bias current adjusting resistor Rb does not exert an influence upon 75$\Omega$ as a resistance value of the RF terminating resistor Rt. When the bias current adjusting resistor Rb exhibiting a well high frequency characteristic is used, however, a synthesized resistance of the bias current adjusting resistor Rb and of the terminating resistor Rt may approximate 75$\Omega$ by omitting the inductor L.

According to this construction, one a single bias current adjusting resistor Rb is provided at the end of every tap-off line TOL, and hence the uniform current flows to all the coaxial connectors (marked with @ in the drawings of this invention) on the tap-off line TOL, whereby a fixed bias current is supplied irrespective of a level of the signal along the tap-off line TOL. Accordingly, if the bias current is set corresponding to a maximum level of the branch output unit of the amplifier BA or EA, effects more preferable than fixed can be all exhibited also in the level-down area of the tap-off line TOL.

[Second Constructive Example of Obviating Ingress Noises]

Figure 4:
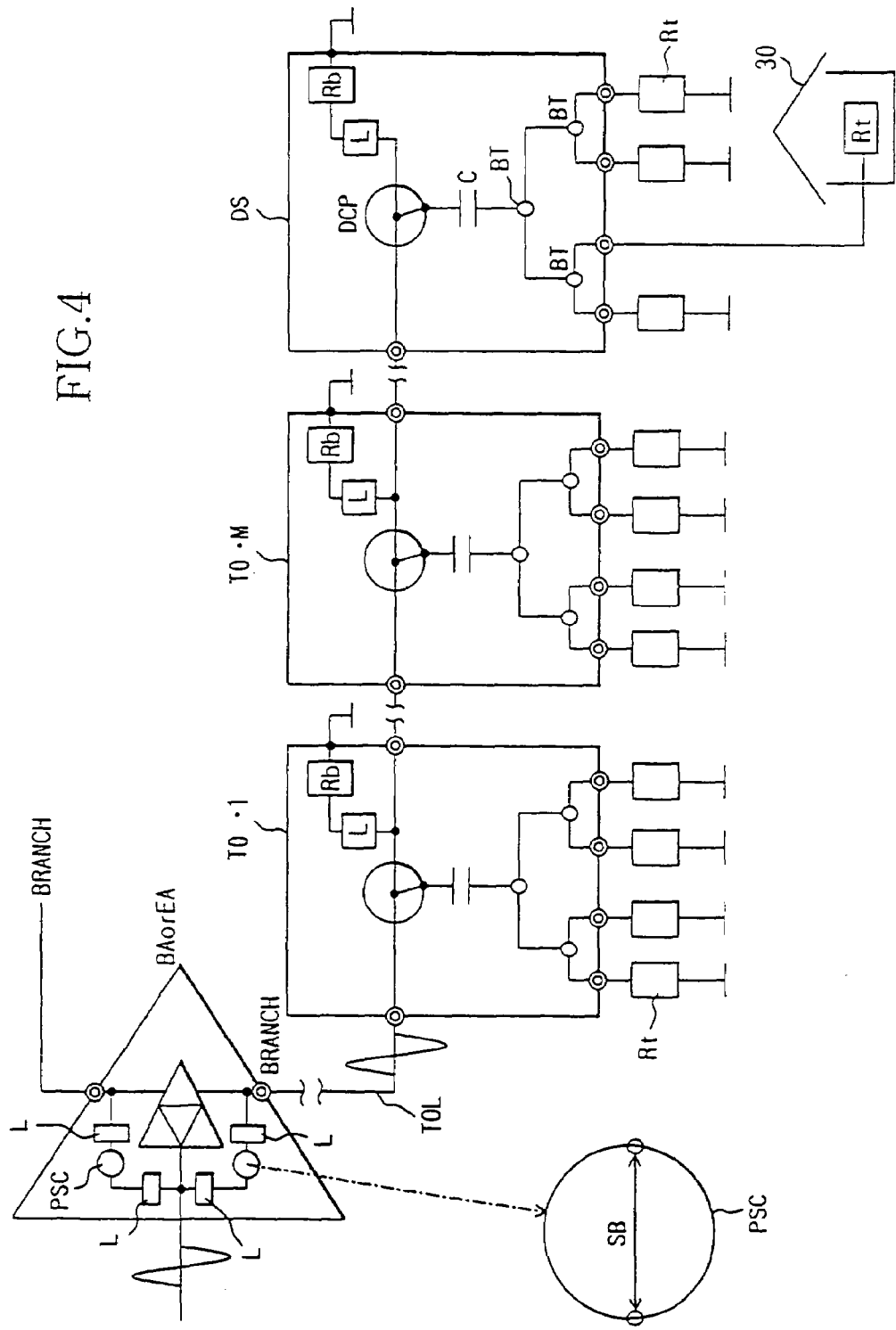
FIG. 4 is a block diagram showing a second constructive example of obviating the ingress noises.

FIG. 4 shows a second constructive example of obviating the ingress noises in the two-way CATV system illustrated in FIG. 1. Referring to FIG. 4, the commercial alternating current (AC) voltage (normally, 40 V through 60 V) for supply to the amplifier is supplied from the output terminal of the amplifier at the terminal of the CATV transmission path 3, more specifically, the branch amplifier (BA) 8 or the extension amplifier (EA) 9, and there are provided on the tap-off line TOL the tap-offs for diverging the downstream signals down to the individual subscriber homes 30, i.e., the AC bias current adjusting resistors Rb connected in series to the inductance elements L for cutting the RF signals inwardly of the branch tap-off TO.1 through TO.M and a distribution tap-off DS as well. Note that the inductance element L may be omitted with the same design as that in the first constructive example.

According to this construction, if the given bias current adjusting resistors Rb are provided in all the tap-offs TO, the bias current is maximized at the branch terminal of the branch amplifier BA or the output terminal of the line extender amplifier EA and diverges at every tap-off TO. Hence, the bias current is distributed stepwise along the tap-off lines TOL. This corresponds to the fact that the RF signal level attenuates along the tap-off line TOL, and therefore the bias current has a larger distribution as the RF signal level becomes higher.

Especially, when the breakdown does not necessarily occur with the DC bias, the non-linear area of the diode effect can be more biased at a distant operating point as the RF signal level gets higher. It is therefore feasible to relieve the inter-modulation distortion of the downstream signal. Further, since the load resistances (Rb) for biasing are disposed in dispersion, an allowable loss of the electric power is reduced, the small-sized resistor easy to be incorporated into the tap-off TO can be used, and besides the heat emission can be dispersed.

[Third Constructive Example of Obviating Ingress Noises]

Figure 5:
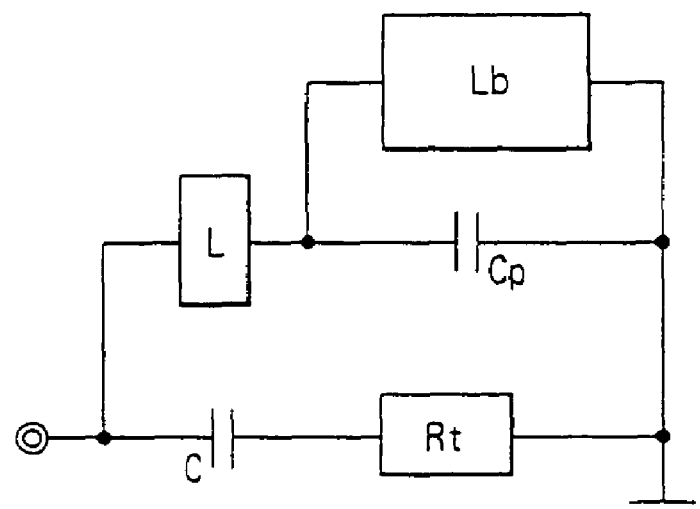
FIG. 5 is a block diagram showing a third constructive example of obviating the ingress noises.
Figure 5:
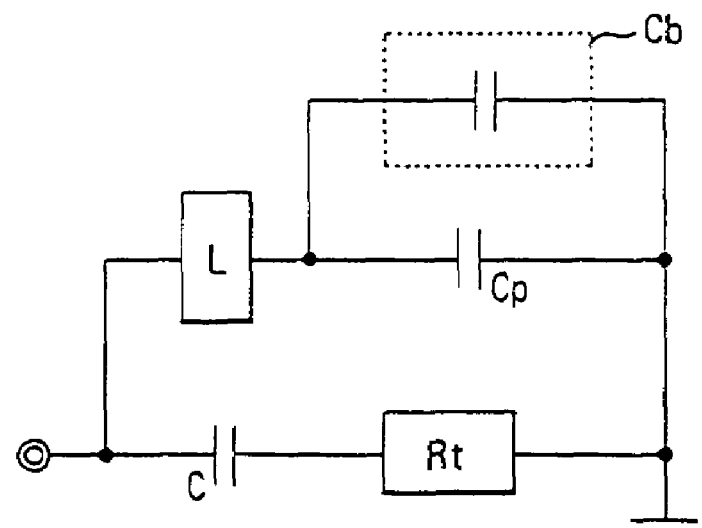

FIG. 5 shows a third constructive example of obviating the ingress noises in the two-way CATV system illustrated in FIG. 1. Referring to FIG. 5, there are given two examples of the RF terminating resistor RF as substitute constructions for the first constructive example described with reference to FIG. 3. FIG. 5(a) shows the example of the RF terminating resistor, wherein the AC bias current adjusting resistor Rb in the first constructive example is replaced with an inductance element Lb for adjusting the AC bias current and an impedance element with respect to a capacitance element Cp for assisting the effect of the inductance elements Lb and L. Incidentally, the inductance element L cuts high-frequency signals of over 10 MHz. An electrostatic capacitance element C cuts low-frequency signals of the direct current to 10 MHz. Further, an RF signal oriented terminating resistor Rt is defined as a 75 Ω resistance for preventing the reflection.

FIG. 5(B) shows the example of the RF terminating resistor, wherein the AC bias current adjusting resistor Rb in the first constructive example is replaced with a capacitance element Cb for adjusting the AC bias current and an impedance element with respect to the capacitance element Cp for assisting the effect of the capacitance element Cb. Note that the inductance element L, the capacitance element C and the RF signal terminating resistor Rt perform the same functions as those in the construction in FIG. 5(A).

According to this construction, dissipation of the AC electric power can be restrained at the terminating element, and the heat emission can be therefore restrained while allowing a comparatively large bias current.

Moreover, a configuration where the electrostatic capacitance element C and the terminating resistor Rt are removed from the RF terminating resistor shown in FIGS. 5 (A) and 5 (B), may serve as a substitute for the second constructive example illustrated in FIG. 4.

[Fourth Constructive Example of Obviating Ingress Noises]

Figure 6:
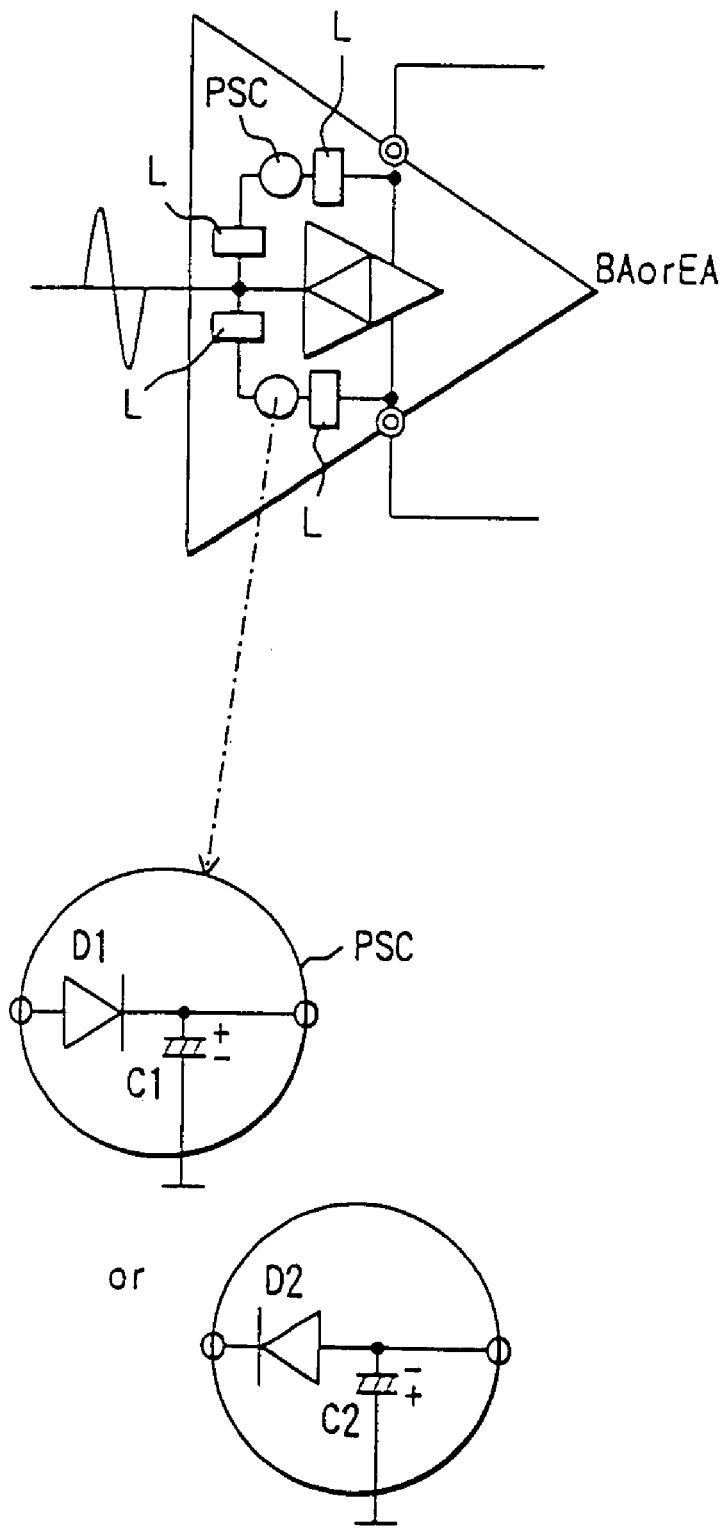
FIG. 6 is a block diagram showing a fourth constructive example of obviating the ingress noises.

FIG. 6 shows a fourth constructive example of obviating the ingress noises in the two-way CATV system illustrated in FIG. 1. Referring to FIG. 6, in the interior of the output terminal of the amplifier at the terminal of the CATV transmission path 3, more specifically, the branch amplifier (BA) 8 or the line extender amplifier (EA) 9, the commercial AC voltage (normally, 40 V through 60 V) for supply to the amplifier is converted into a direct current via a rectification element D1 and a smoothing capacitance element C1 or via a rectification element D2 and a smoothing capacitance element C2, and a positive or negative voltage is superposed with the RF signal voltage and thus transmitted to the tap-off line TOL. Then, the superposed voltage is supplied to the RF terminating resistor in the first or second constructive example shown in FIG. 3 or 4.

The current can be pulsated by removing the smoothing capacitance elements C1, C2 in those constructions or restricting the capacitance thereof, and the embodiment can be similarly carried out by superposing this pulsating current of the positive or negative voltage with the RF signal voltage and thus transmitted to the tap-off line TOL.

In the fourth constructive example, if the non-linearity of the contact portion of the coaxial connectors becomes different depending on the direction of the applied voltage due to the contact between the different kinds of base metals, or if electrically chemically given a contact potential difference in a fixed direction, DC superposing and pulsating superposing are effective in restraining the inter-modulation distortion noises caused by the non-linearity by offsetting this polarity effect.

[Fifth Constructive Example of Obviating Ingress Noises]

Figure 7:
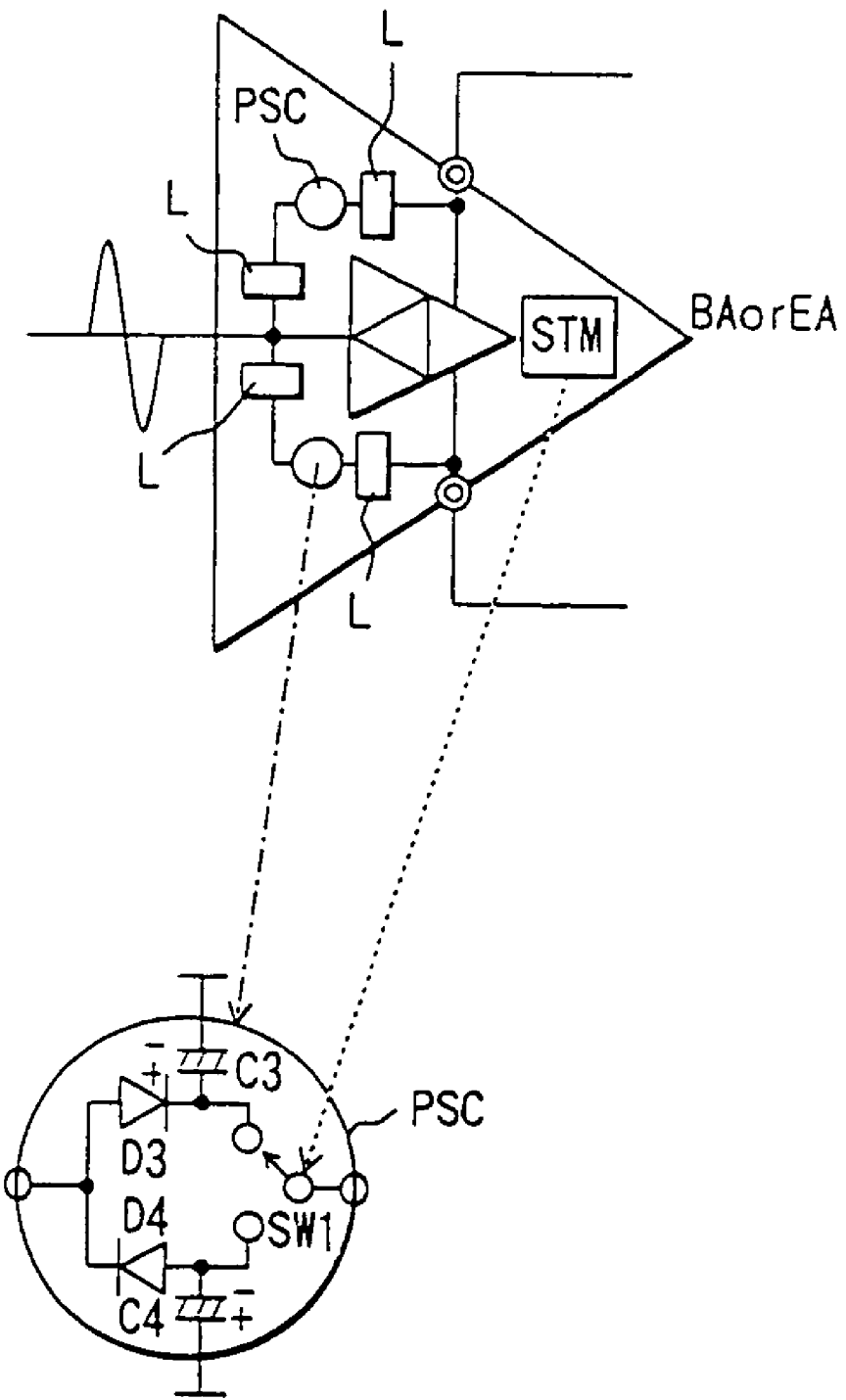
FIG. 7 is a block diagram showing a fifth constructive example of obviating the ingress noises.

FIG. 7 shows a fifth constructive example of obviating the ingress noises in the two-way CATV system illustrated in FIG. 1. Referring to FIG. 7, in the interior of the output terminal of the amplifier at the terminal of the CATV transmission path 3, more specifically, the branch amplifier (BA) 8 or the line extender amplifier (EA) 9, a positive voltage is generated from the commercial AC voltage (normally, 40 V through 60 V) for supply to the amplifier via an amplifier output terminal directed rectification element D3 and smoothing capacitance element C3, and a negative voltage is generated via an opposite-directed rectification element D4 and smoothing capacitance element C4.

The electric power supply switching board PSC is provided with a switch SW1 for selecting any one of the positive and negative voltages is selected in response to a control signal transmitted from the CATV center station 1, e.g., a control signal transmitted to the amplifier from the center station 1 when in a status monitor process, and outputting this selected voltage. The generated positive or negative voltage is superposed with the RF signal voltage and then transmitted to the tap-off line TOL, and supplied to the first or second RF terminating resistor shown in FIG. 3 or FIG. 4.

According to this construction, the contact portion of the coaxial connectors is electrically chemically polarized by applying the DC voltage exhibiting the fixed polarity, and the bias current effect disappears for a long period of time, in which case the polarity of the bias voltage can be controlled at a far distance at an arbitrary time. It is therefore feasible to manage and restrain the inter-modulation distortion noises due to the non-linear effect of the contact portion down to a fixed level or under and to enhance the maintainability.

[Sixth Constructive Example of Obviating Ingress Noises]

Figure 8:
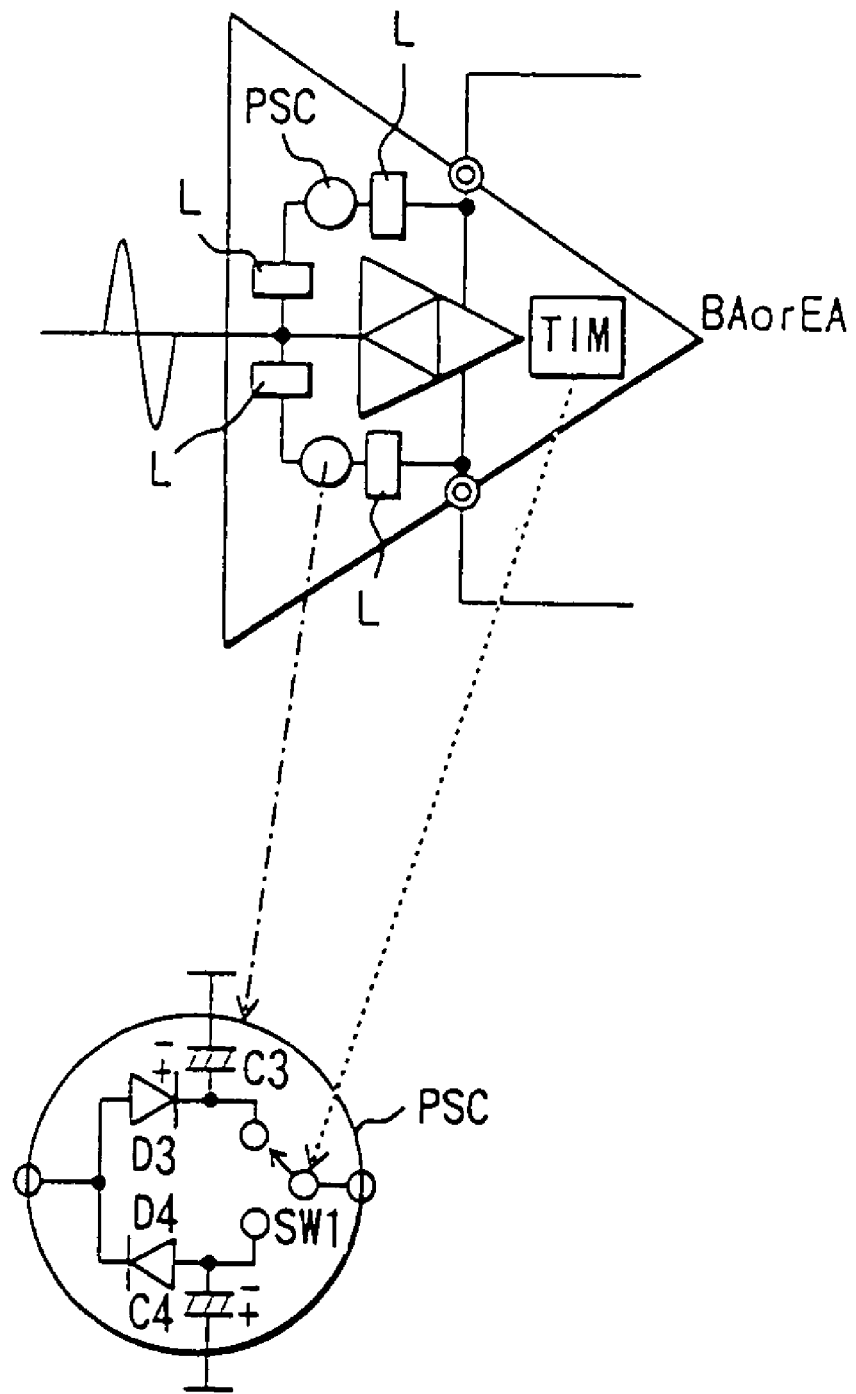
FIG. 8 is a block diagram showing a sixth constructive example of obviating the ingress noises.

FIG. 8 shows a fourth constructive example of obviating the ingress noises in the two-way CATV system illustrated in FIG. 1. The fifth constructive example shown in FIG. 7 is that the electric power supply switching board PSC is provided with the switch SW1 for selecting any one of the positive and negative voltages generated in response to the control signal from the CATV center station 1, e.g., the control signal transmitted to the amplifier from the center station 1 when in the status monitor process, and outputting this selected signal. Referring to FIG. 8, the sixth constructive example is that there is provided a switch SW1 for switching over the positive or negative voltage at an interval of a fixed cycle in response to an output of a long-cycle timer TIM built in the amplifier.

According to this construction, the contact portion of the coaxial connectors is electrically chemically polarized by applying the DC voltage exhibiting the fixed polarity, and the bias current effect disappears for a long period of time, in which case the polarity of the bias voltage is changed over at a fixed long cycle. It is therefore feasible to restrain the inter-modulation distortion noises due to the non-linear effect of the contact portion down to a fixed level or under and to enhance the maintainability.

[Seventh Constructive Example of Obviating Ingress Noises]

Figure 9:
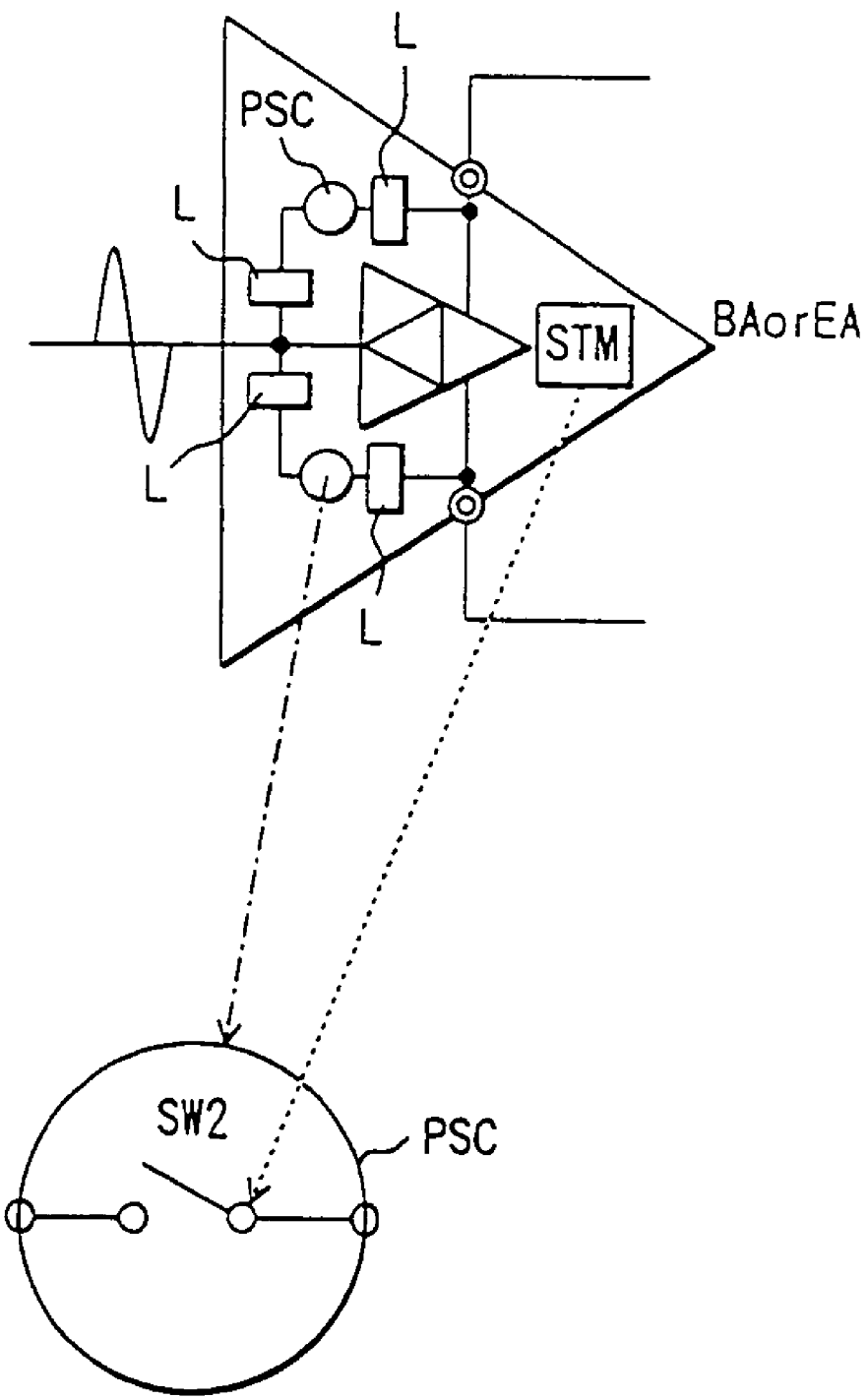
FIG. 9 is a block diagram showing a seventh constructive example of obviating the ingress noises.

FIG. 9 shows a seventh constructive example of obviating the ingress noises in the two-way CATV system illustrated in FIG. 1. Referring to FIG. 9, the electric power supply switching board PSC of the amplifier at the terminal of the CATV transmission path 3, to be more specific, the branch amplifier (BA) 8 or the line extender amplifier (EA) 9, includes a switch SW2 for validating or invalidating a judgement as to whether the bias current is supplied to the tap-off line TOL, responding to the control signal given from the CATV center station 1, e.g., the control signal when in the status monitor process.

A geometry using this switch SW2 may be a substitute configuration for the first and second constructive example shown in FIGS. 3 and 4, wherein the electric power supply switching board PSC is based on the fixed setting including the disposition of the short bar SB. Further, the switch SW2 can be used in combination with the construction of the electric power supply switching board PSC in the fourth, fifth and sixth constructive examples shown in FIGS. 6, 7 and 8.

In this construction, the bias current is supplied corresponding to the necessity in terms of a quality management when there abnormally rises an absolute quantity of the ingress noises derived from the non-linearity of the contact portion of the coaxial connectors, and it is therefore possible not only to save the integrating consumption electric power but also to attain periodic batchwise cleaning to cause the breakdown in the contact portion at one time by causing a large current to flow in a short time.

[Eighth Constructive Example of Obviating Ingress Noises]

Figure 10:
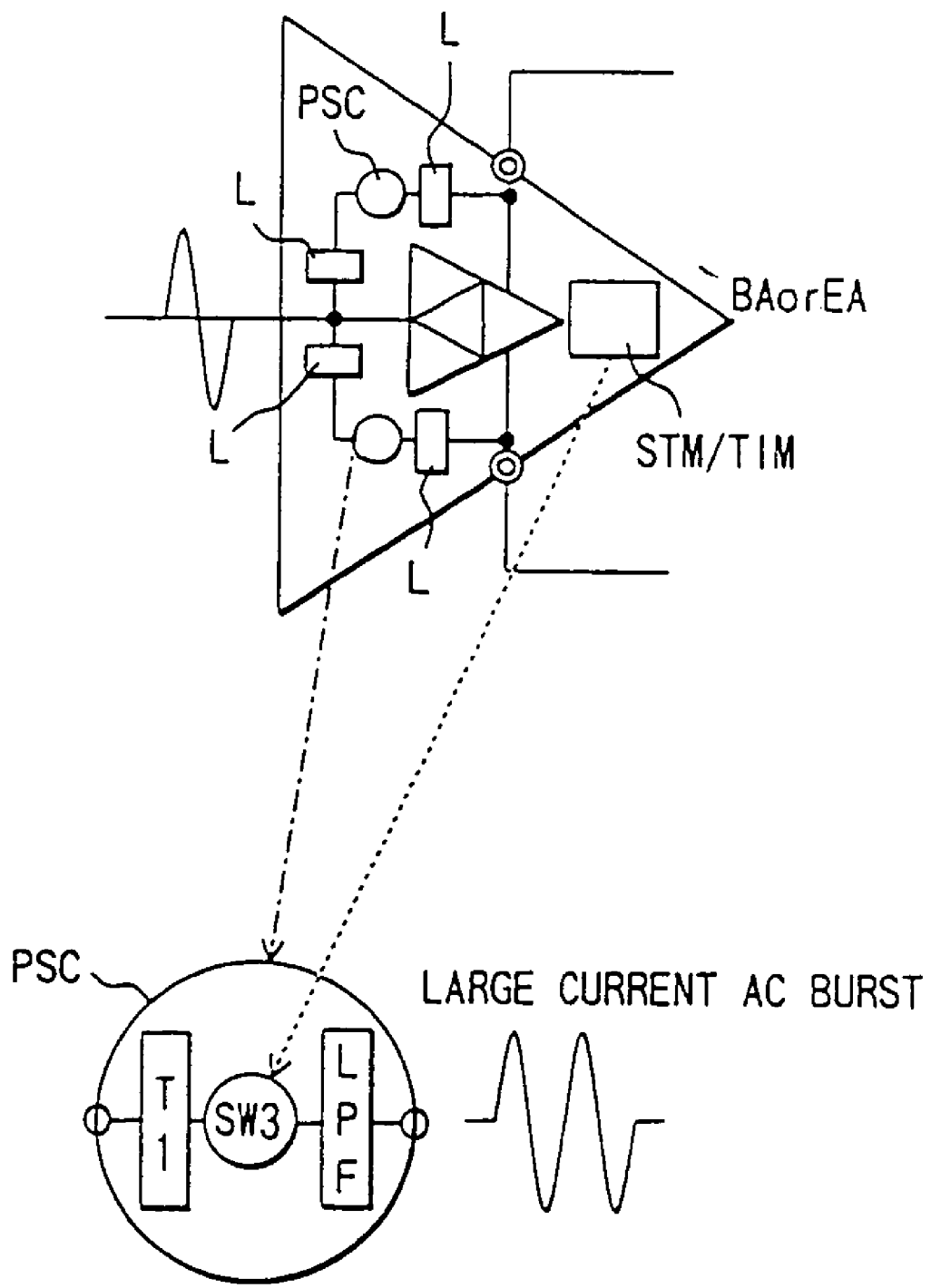
FIG. 10 is a block diagram showing an eighth constructive example of obviating the ingress noises.

FIG. 10 shows an eighth constructive example of obviating the ingress noises in the two-way CATV system illustrated in FIG. 1. Referring to FIG. 10, the electric power supply switching board PSC of the amplifier at the terminal of the CATV transmission path 3, to be more specific, the branch amplifier (BA) 8 or the line extender amplifier (EA) 9, includes a transformer (boost transformer) T1 for boosting the commercial AC voltage for the supply to the amplifier from a power supply device 20, a switch SW3 for applying a large voltage in burst for a short period of time, and a low-pass filter LPF for restraining the noises into the transmission band of the RF signals by blunting rising and falling waveforms of the burst current. The operation of the switch SW3 is controlled at an interval of a fixed time by the control signal given from the CATV center station 1 or by the built-in timer TIM.

In this construction, it is feasible to effectively apply the large AC bias current on a time-period basis without exerting an influence on the RF signals.

[Ninth Constructive Example of Obviating Ingress Noises]

Figure 11:
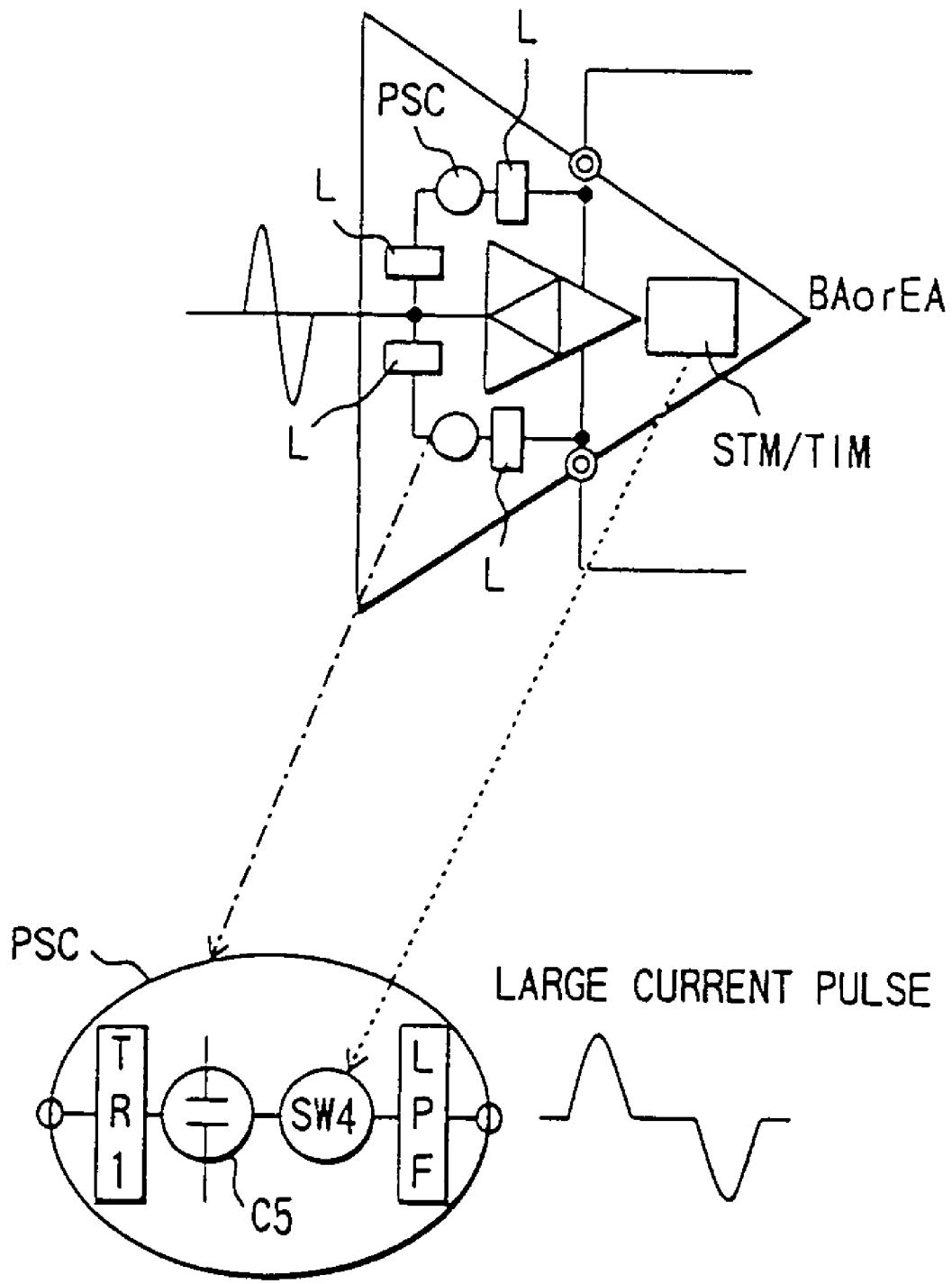
FIG. 11 is a block diagram showing a ninth constructive example of obviating the ingress noises.

FIG. 11 shows a ninth constructive example of obviating the ingress noises in the two-way CATV system illustrated in FIG. 1. Referring to FIG. 11, the electric power supply switching board PSC of the amplifier at the terminal of the CATV transmission path 3, to be more specific, the branch amplifier (BA) 8 or the line extender amplifier (EA) 9, includes a multi-stage boost rectifying circuit (or a rectifying circuit and a boost DC—DC converter) TR1, an electrostatic capacitance element C5 for accumulating a high voltage, a switch SW4 for discharging the high voltage in pulse on the time-period basis, and the low-pass filter LPF for restraining the noises into the transmission band of the RF signals by blunting rising and falling waveforms of the pulse current. The operation of the switch SW4 is controlled at an interval of a fixed time by the control signal given from the CATV center station 1 or by the built-in timer TIM.

In this construction, it is possible to effectively apply the large pulse bias current on the time-period basis without exerting the influence on the RF signals.

[Example of Ingress Noises Obviating Effect Data]

FIGS. 12 through 16 show noise spectrum waveforms in transmission bands (12 MHz to 60 MHz) of the upstream signals which are measured under a variety of conditions at the head end of the actual CATV center station 1. Referring to FIGS. 12 through 16, there exist no upstream RF signals, and the low-pass filter cuts the high frequencies over approximately 55 MHz.

Figure 12:
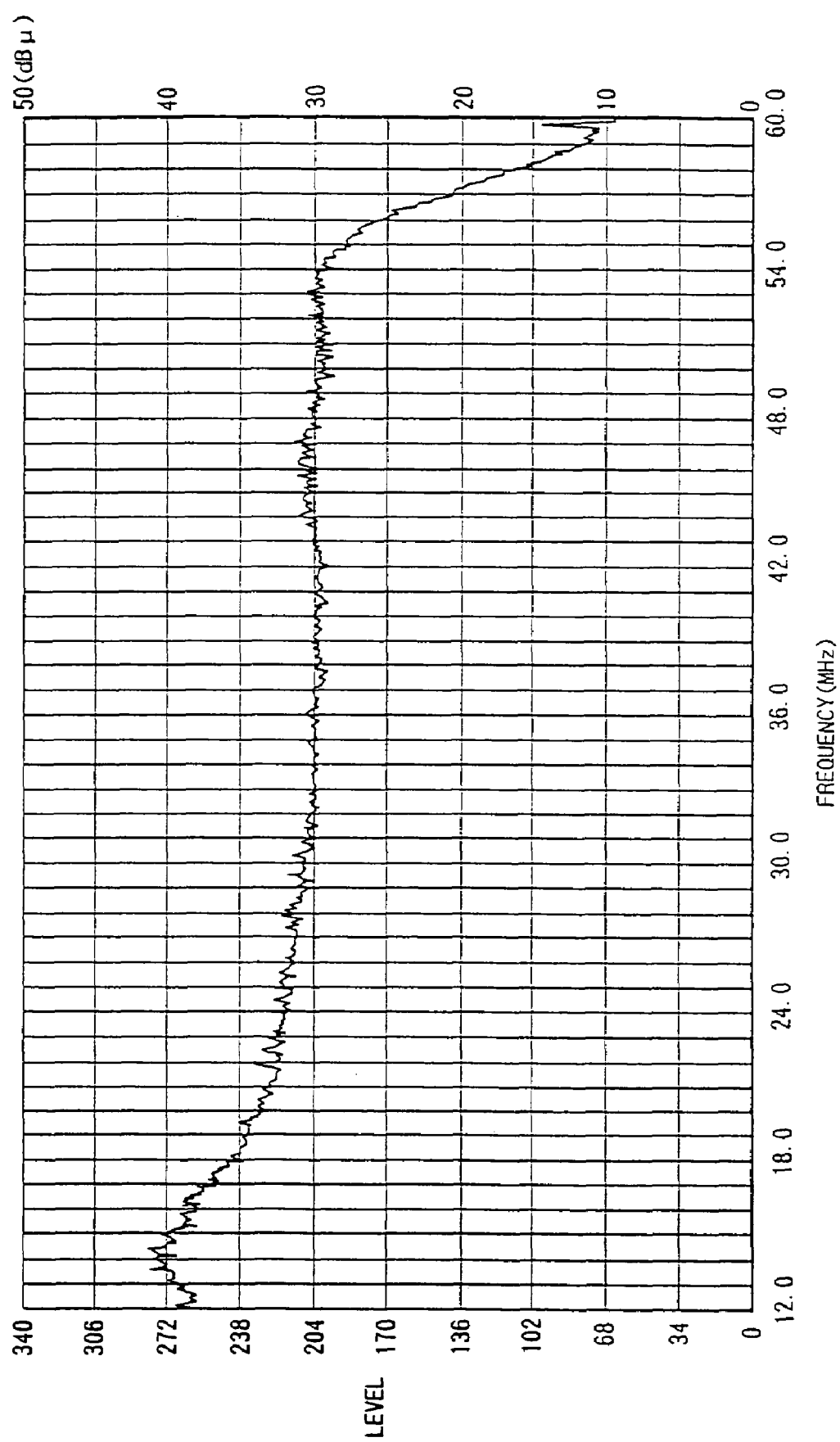
FIG. 12 is a diagram showing explanatory data for a ingress noises obviating effect.

What is shown in FIG. 12 is mainly a floor of ingress thermal noises of a subordinate multi-stage amplifier and a light opposed repeater, which are base noises unavoidable on the CATV transmission path 3 taking the tree structure.

Figure 13:
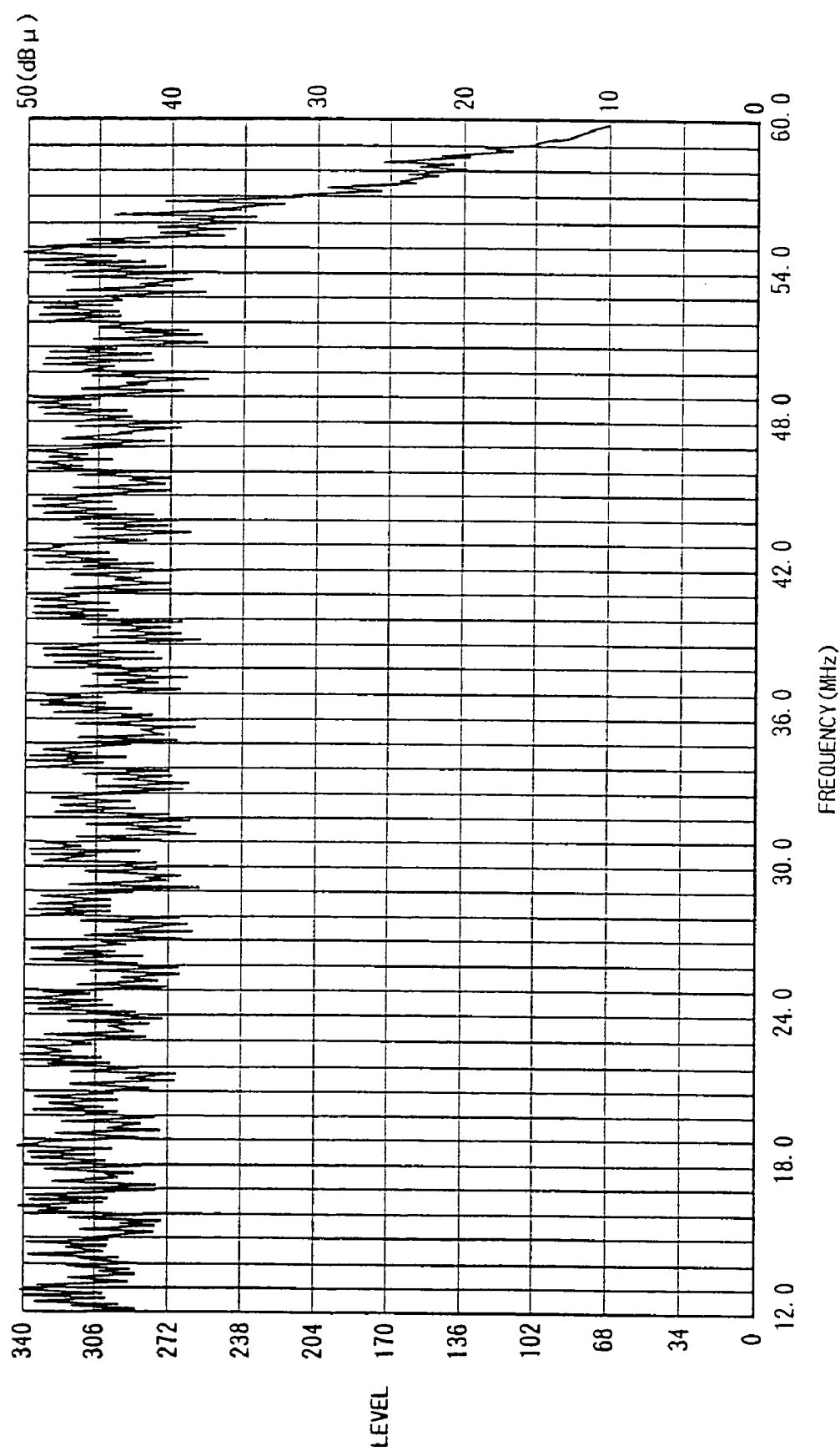
FIG. 13 is a diagram showing the explanatory data for the ingress noises obviating effect.
Figure 14:
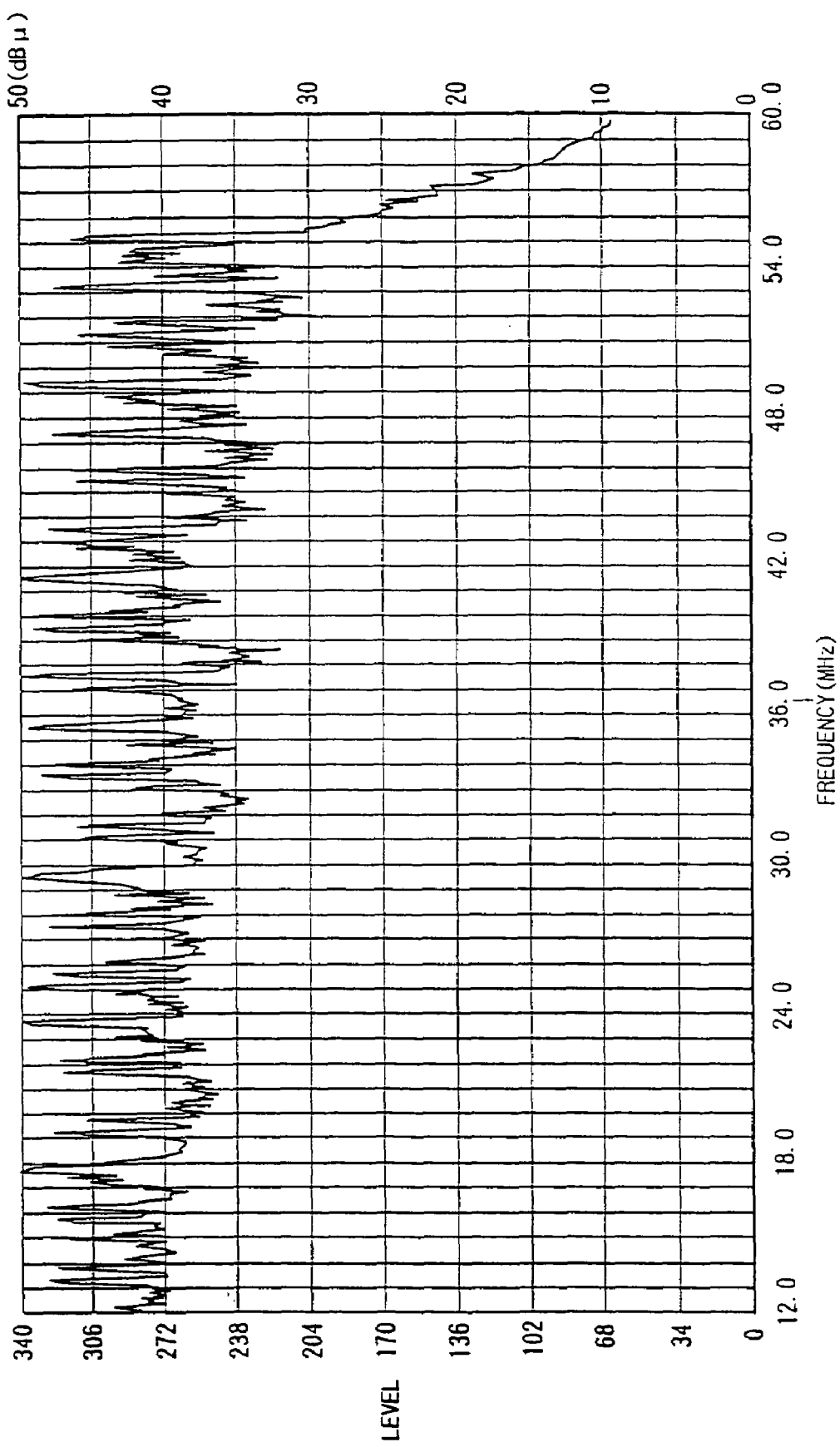
FIG. 14 is a diagram showing the explanatory data for the ingress noises obviating effect.
Figure 15:
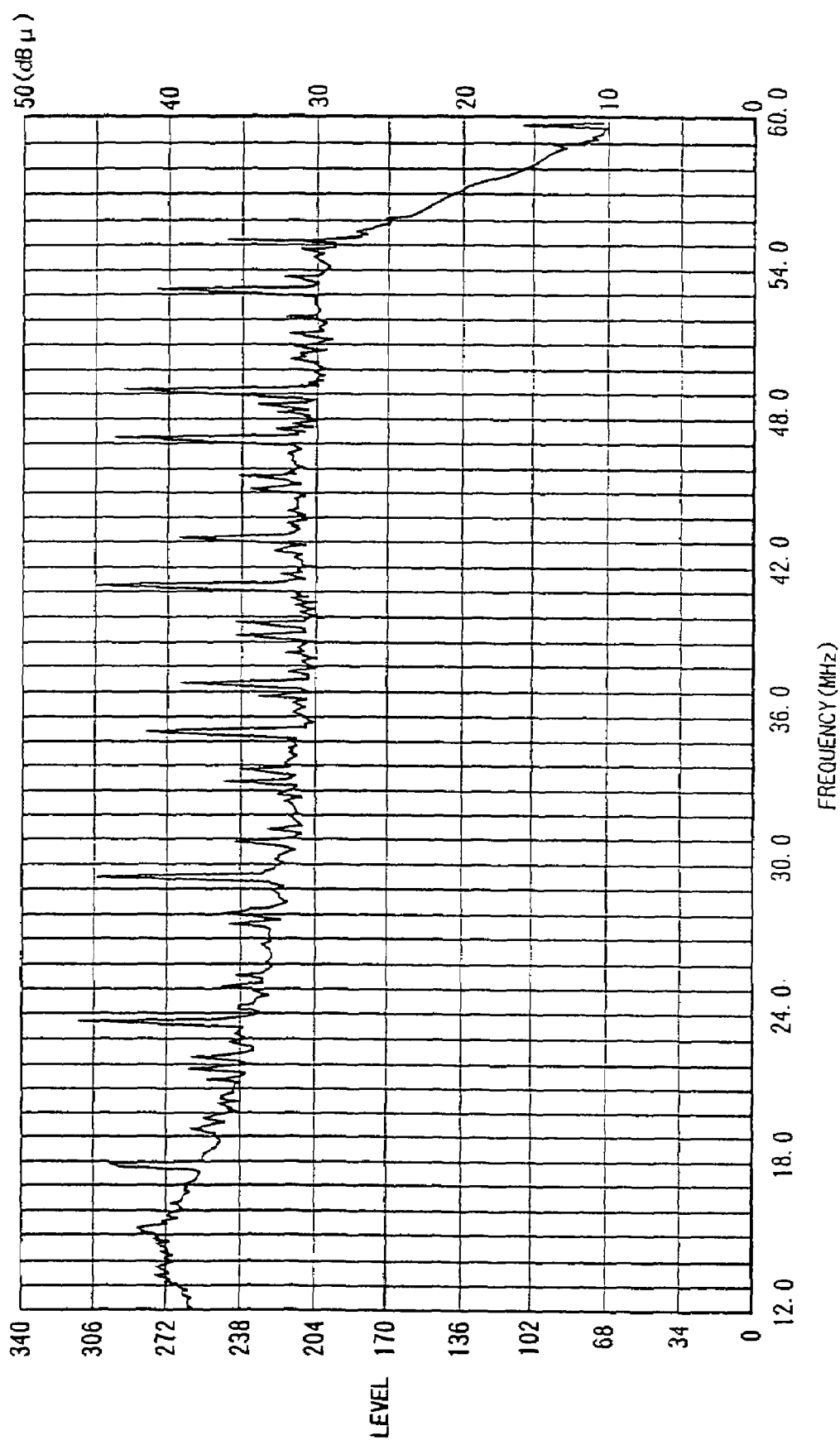
FIG. 15 is a diagram showing the explanatory data for the ingress noises obviating effect.

FIGS. 13, 14 and 15 showdown stream signal inter-modulation distortion noises caused at an interval of several hours as well as with an elapse of time due to a change in the contact state of passive elements such as the coaxial connectors, which appears on the base noises shown in FIG. 12, wherein periodicity of 2 MHz to 6 MHz can be seen. Those are the ingress noises to be obviated in the two-way CATV system according to the present invention.

FIG. 14 shows the inter-modulation distortion noises caused when an extremely small quantity of bias current ($\mu$ A-order) flows only by applying the AC bias current to the tap-off line TOL subordinate to the amplifier at the terminal of the CATV transmission path, i.e., the branch amplifier 8 and the extension amplifier 9. An average level is slightly lowered, and the spectrum is acute, however, a density thereof slightly decreases.

FIG. 15 shows the inter-modulation distortion noises caused when the AC bias current on the order of a milliampere flows to the tap-off line TOL, wherein the noise spectrum is considerably sparse. Further, if a level of the bias current is increased several times, as illustrated in FIG. 16, the noise spectrum exhibiting beard-like undulations disappears, and there exits only the noise floor of the thermal noises.

Although only a few embodiments of this invention have been described in detail above, those skilled in the art will readily appreciate that many modifications are possible in the preferred embodiments without departing from the novel teachings and advantages of this invention. Accordingly, all such modifications are intended to be included within the scope of this invention as defined by the following claims.

What is claimed is:

1. A two-way CATV system comprising:
at least one bidirectional amplifier provided on a CATV transmission path for connecting a CATV center station to a subscriber home;
bias voltage superposing means for superposing, with an AC frequency bias voltage within a bidirectional amplifier at the terminal of said at least one bidirectional amplifier, a downstream RF frequency signal transmitted along a coaxial transmission path subordinate to the bidirectional amplifier at the terminal; and
bias current adjusting load means, provided at the end of said coaxial transmission path, for setting an AC frequency bias current corresponding to an application of the AC frequency bias voltage superposed by said bias voltage superposing means and for flowing a uniform AC frequency current on said coaxial transmission path; and wherein said bias current adjusting load means includes an inductive element in series with a resistance element coupled by a parallel connection to a terminating resistance element, wherein said inductive element is selected so that the resistance of the coupled current adjusting load means and terminating resistance element approximates the resistance of the terminating resistance element for RF signals.

2. A two-way CATV system comprising:

at least one bidirectional amplifier provided on a CATV transmission path for connecting a CATV center station to a subscriber home;

bias voltage superposing means for superposing, with an AC frequency bias voltage within a bidirectional amplifier at the terminal of said at least one bidirectional amplifier, a downstream RE frequency signal transmitted along a coaxial transmission path subordinate to the bidirectional amplifier at the terminal; and bias current adjusting load means, provided at the end of said coaxial transmission path, for setting an AC frequency bias current corresponding to an application of the AC frequency bias voltage superposed by said bias voltage superposing means and for flowing a uniform AC frequency current on said coaxial transmission path; and wherein said bias current adjusting load means includes an inductive element in series with an impedance circuit couple by a parallel connection to a terminating resistance element, wherein said impedance circuit includes a capacitive element coupled by a parallel connection to a second inductive element or a second capacitive element, and wherein said inductive element is selected so that the resistance of the coupled current adjusting load means and terminating resistance element approximates the resistance of the terminating resistance element for RF signals.

3. A two-way CATV system according to claim 1, wherein said AC frequency bias current is set at a level to overcome a diode effect of a coaxial connector in the coaxial transmission path.

4. A two-way CATV system according to claim 1, wherein said AC frequency bias current is set at a level to match a maximum branch output current level of the bidirectional amplifier.

* * * * *